Jan. 30, 1962     C. F. BACHLE     3,018,625
INTERNAL COMBUSTION TURBINE ENGINE
Filed June 27, 1960     2 Sheets-Sheet 2

INVENTOR.
CARL F. BACHLE
BY
Hauke & Hauke.
ATTORNEYS

United States Patent Office 3,018,625
Patented Jan. 30, 1962

3,018,625
INTERNAL COMBUSTION TURBINE ENGINE
Carl F. Bachle, Grosse Pointe, Mich., assignor to Continental Aviation and Engineering Corporation, Detroit, Mich., a corporation of Virginia
Filed June 27, 1960, Ser. No. 38,831
5 Claims. (Cl. 60—39.65)

This invention relates to an internal combustion turbine engine and more particularly to an improved combuster construction therefor and to an improved air cooling means for shielding a power shaft in a turbine engine of the type having an annular combuster surrounding the power shaft.

In such turbine engines, the size of the combuster is somewhat restricted in these engines by reason of the fact that the inner wall of the annular combuster is spaced from the shaft sufficiently to provide adequate air conducting means for feeding air to the combuster through air inlet ports in the combuster inner wall and for shielding the shaft from the heat of combustion. It has been found that the combusters of this design restrict or otherwise hold back engine efficiency necessary in such engines where engine length and diameter are important factors. As is well known, the rate of pressure rise through combustion is an important matter of consideration since engine efficiency is dependent largely on having complete combustion of the gases before being exhausted from the combuster to the turbine and tail pipe.

It is an object of the present invention to generally improve turbine engine efficiency by effecting more efficient combustion in an annular combuster of maximum cubic inch capacity within the minimum overall engine dimensions as dictated by maximum size limitations imposed on this type of turbine engine.

Another object of this invention is to provide for more efficiency in a turbine engine of the character described and comprising an annular combuster by providing a combuster formed of outer and inner walls of revolution about the shaft axis and having air inlet openings only in said combuster outer wall, which openings cooperate with a combuster of novel design and shape to obtain a maximum rate of burning, which invention is particularly effective with a rotating fuel injecting means for attaining a maximum of turbulence.

A still further object of the present invention is to construct an improved turbine engine comprising an annular combuster formed of inner and outer walls of revolution about the power shaft axis, and in which said combuster inner wall is preferably closely adjacent to and concentrically disposed about the power shaft, by providing an improved means for flowing air between the said shaft and combuster inner wall whereby to more effectively shield the shaft from the heat generated in said combuster.

Figure 1:
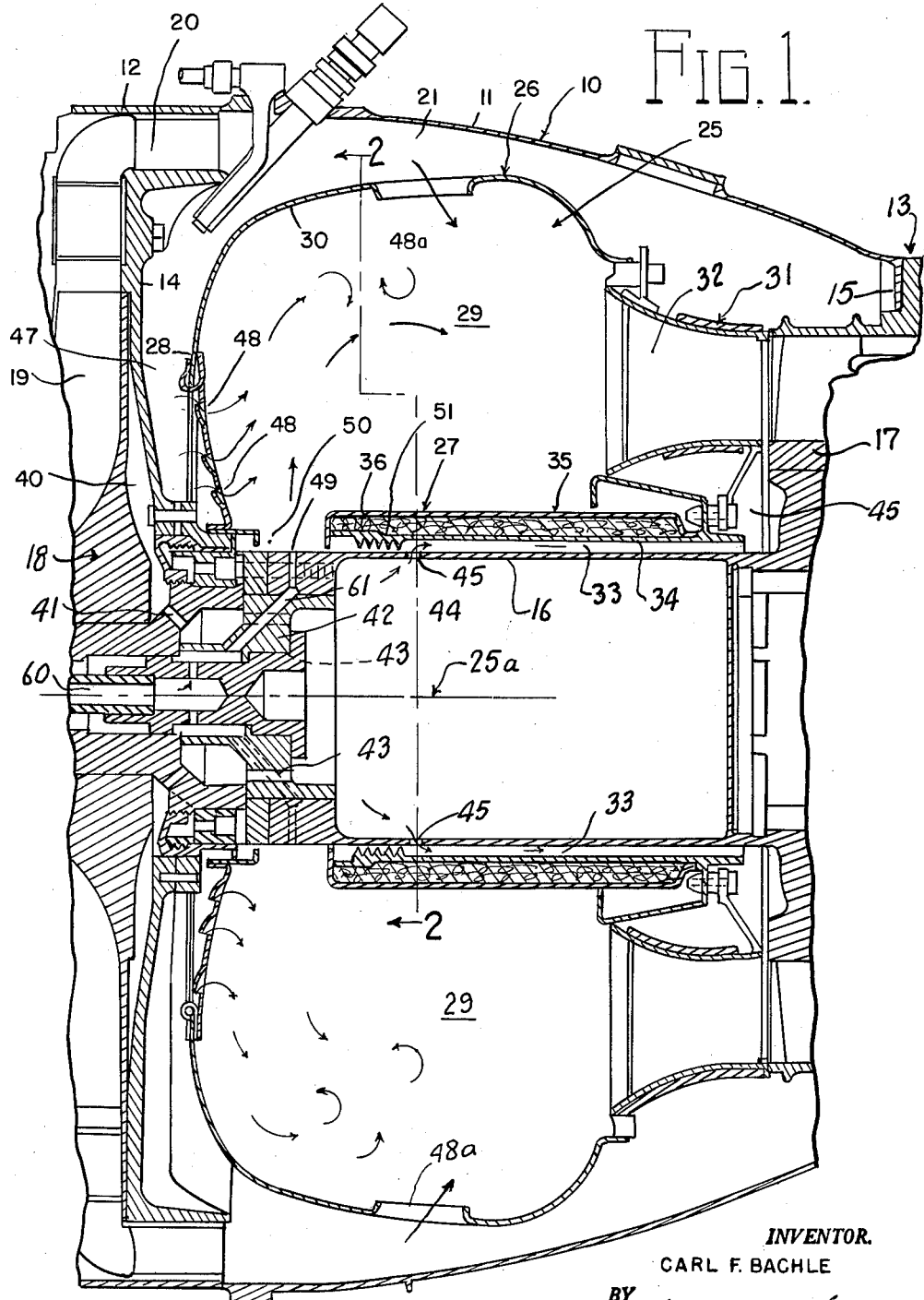
Figure 2:
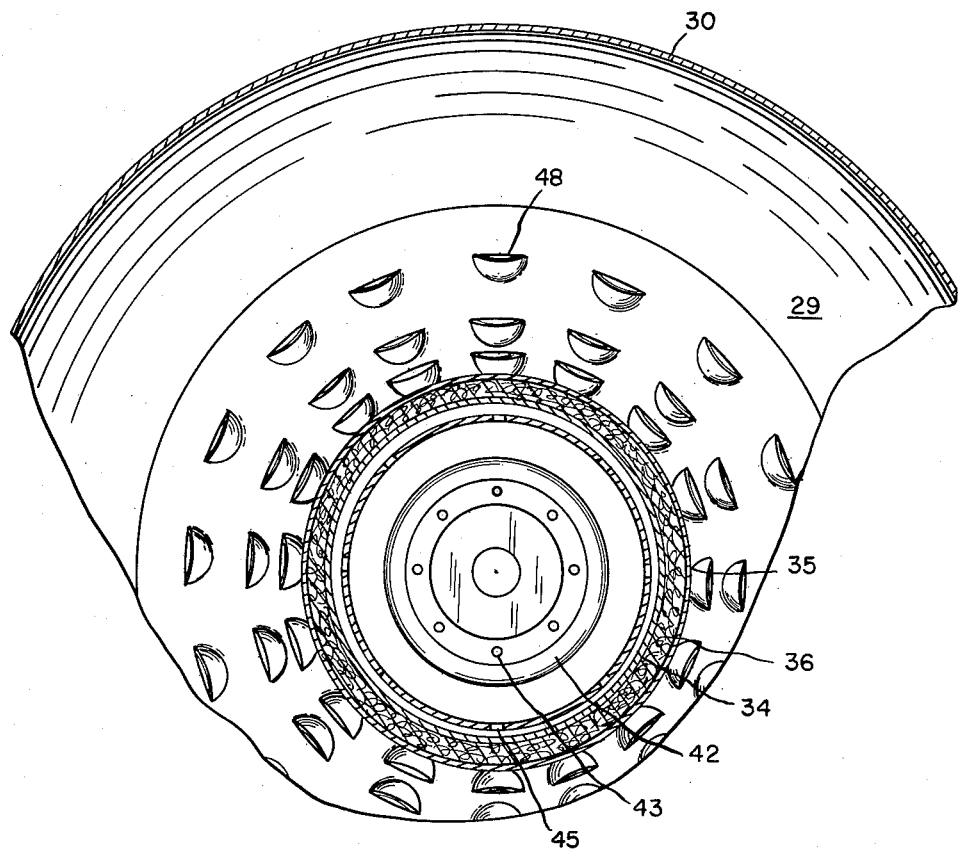

For a more detailed understanding of the invention, reference may be had to the accompanying drawings illustrating a preferred embodiment of the invention in which characters of reference refer to like parts throughout the several views and in which FIG. 1 is a longitudinal sectional view through an internal combustion turbine engine embodying the principles of the invention, and FIG. 2 is a detail transverse sectional view taken substantially on the line 2—2 of FIG. 1.

The internal combustion turbine engine of the type as herein illustrated represents a typical construction embodying an engine casing 10 comprising an outer medial shell 11, a front casing structure 12 and a rear casing structure 13, said casing structures comprising a front wall 14 and a rear wall 15. A hollow or tubular power shaft 16 is supported by suitable bearings by said casings and drivingly connects the turbine wheel 17 with the air compressor 18, which in the engine herein illustrated preferably comprises a centrifugal air compressor of the type having an impeller 19 constructed to discharge air into an outlet 20 and thence into an annular air chamber 21.

The combuster 25 comprises an outer wall 26 of revolution about the shaft axis 25a and an inner wall 27 of revolution about said shaft axis. Said combuster outer wall comprises a radially extending portion 28 forming a front wall of the combustion chamber 29, and a longitudinally extending portion 30, secured at the rear in any suitable manner to the casing structure near the turbine wheel, said casing structure having a conventional diffuser section 31 forming the combuster outlet 32 through which the hot, highly compressed products of combustion are discharged toward the turbine wheel 17.

The combuster inner wall structure is preferably located quite closely adjacent to the hollow or tubular power shaft 16, same being spaced to provide an elongated annular air space 33 surrounding substantially all said shaft lying within or enclosed by said combuster. Preferably this combuster inner wall comprises a tubular wall 34 arranged substantially concentric to the shaft and cooperating with the shaft to provide said annular air space 33, and a sleeve 35 spaced from the wall 34 to provide a heat shield, the space between the sleeve 35 and wall 34 being preferably packed with a suitable heat resistant material 36. This construction or some equivalent construction as found desirable forms a very effective heat shield for the shaft from the heat as generated in the closely adjacent combuster.

Air leakage from the impeller casing, preferably from the space 40, at a pressure less than the air pressure in space 21, is diverted to flow through a hole 41 into the interior of the hollow power shaft, more particularly into that portion 42 inside of said shaft to the front of the fuel slinger structure 42, thence through holes 43 into the hollow shaft to the rear of the fuel slinger, indicated by reference character 44. The air then flows through holes 45 in the shaft into the annular space 33 around the shaft and between said shaft and said combuster inner wall, and thence to space 45 from which the air may leak into the engine exhaust. There is a drop in pressure from space 40 to space 45 to induce flow of air. The air passage 47 radially extends between the end wall 14 of the casing and front wall 28 of the combuster, this air passage being in open communication with air chamber 21 and serving to conduct air from the chamber 21 to the air inlet openings 48 in the combuster outer wall portion 28 and thence into the combustion chamber 29 where same is directed towards the fuel spray as sprayed into the combustion chamber from the fuel outlet orifices 49 of the fuel slinger 42, which fuel is sprayed through the annular fuel inlet gap 50 formed by the combuster walls and which faces towards the shaft, said fuel slinger outlet orifices being radially aligned with this annular fuel inlet gap.

The fuel slinger is preferably connected with a source of fuel supply (not shown) by a passage 60, fuel being thereby supplied to the fuel slinger passages 61 and thence to the fuel outlet orifices 49.

The combuster as constructed provides a combustion chamber of a maximum volume as permissible by the limitations as imposed on engine overall dimensions. There are no air inlet openings in the combuster inner wall, all the air for combustion being admitted through air inlet openings in the combuster outer wall, one stream of air for primary combustion being admitted through openings 48, and a second stream of air being admitted to the combustion chamber through secondary openings 48a into the secondary portion of the combustion chamber.

Said air space 33 about the shaft 16 is closed to the combustion chamber, as same is sealed off from the annular intake gap 50 by a suitable labyrinth seal 51.

Although but one preferred construction is shown, which embodies the principles of the invention, it will be apparent to those skilled in the art to which this invention pertains, that various modifications and changes may be made thereto, without departing from the spirit of the invention or from the scope of the appended claims.

I claim:

1. In an internal combustion turbine engine comprising an engine casing, having a front wall and a rear wall, a power shaft supported by said casing, an air compressor and a turbine wheel mounted on said shaft, a fixed annular combustion chamber concentrically disposed about said shaft between said compressor and turbine wheel and having an outer wall of revolution spaced inwardly of said casing to provide an annular air chamber connected with the air compressor outlet and having a radially extending portion axially spaced from said casing front wall to provide an inwardly radially extending air passage, said combustion chamber radially extending wall portion provided with air inlet openings communicating with the aforesaid air passage and comprising the sole means for introducing air into said combustion chamber, a fuel induction means comprising a fuel slinger secured to said shaft and connected with said fuel induction means and having a fuel outlet orifice, said combustion chamber having an inner imperforate wall of revolution disposed substantially parallel with and closely adjacent to said shaft, said inner and outer walls of said annular combustion chamber arranged to provide an annular gap radially aligned with respect to the fuel outlet orifice of said fuel slinger, said fuel slinger arranged to inject fuel in a spray adjacent to but spaced to the rear of the radially extending portion of said outer wall of said combustion chamber, said air inlet openings of said combustion chamber constructed to direct said air toward said fuel spray, and means for flowing air into the space between said shaft and said inner wall of revolution of said combustion chamber and by-passing said combustion chamber to shield the shaft from the heat generated in said combustion chamber.

2. An internal combustion turbine engine as in claim 1 wherein the inner combustion chamber wall comprises a tubular member radially spaced from said shaft and which encloses substantially all said shaft enclosed by said combustion chamber from said annular gap to said combustion chamber outlet adjacent to said turbine wheel.

3. In an internal combustion turbine engine, comprising an engine casing having a front wall and a rear wall, a hollow power shaft supported by said engine casing, an air impeller and a turbine wheel mounted on said shaft and axially spaced apart, an annular combuster supported by the casing and disposed between said impeller and turbine wheel and comprising inner imperforate wall of revolution and outer wall of revolution concentric with said shaft axis, said outer combuster wall comprising an axially extending portion radially spaced inwardly from said casing to provide an annular air chamber connected with the air impeller outlet and a radially extending portion defining a front wall of the combuster and axially spaced from the front wall of the casing to provide an inwardly radially extending air passage communicating with the annular air chamber, said combuster front wall having air inlet ports connecting the combuster interior with said radially extending air passage and comprising the sole means for introducing air into said combustion chamber, said inner and outer combuster walls constructed to provide an annular gap facing said shaft, a fuel supply means, a fuel slinger secured to said shaft and provided with fuel outlet orifices radially aligned with said annular gap, and means diverting some of the air from said impeller into the hollow interior of said shaft, said combuster inner wall structure enclosing said shaft and radially spaced therefrom, and means flowing air from the interior of the shaft to said annular space between said shaft and said inner combuster wall structure and discharging said air therefrom adjacent to the turbine.

4. An internal combustion turbine engine as in claim 3, wherein said fuel slinger comprises a member fastened to said shaft and provided with an extension extending axially inside said shaft having a fuel inlet duct and a head portion extending transversely of the shaft, and said means for diverting said air consists of a duct flowing said air into the hollow shaft in front of said slinger head, thence through said slinger head into the hollow shaft to the rear of said slinger head, said slinger head having an air passage open to the hollow shaft.

5. An internal combustion turbine engine comprising an engine casing, a tubular power shaft supported by said casing, an air compressor and a turbine wheel mounted on said shaft, and an annular combuster located between said air compressor and turbine wheel and consisting of inner and outer walls of revolution coaxial with said shaft, said combuster outer wall radially inwardly spaced from the casing to provide an annular air chamber surrounding the combuster, said air compressor having an outlet discharging compressed air into said annular air chamber, said combuster inner wall of revolution comprising an imperforate wall disposed substantially adjacent to and in radial spaced concentric relation with respect to said shaft, said combuster outer walls having air inlet openings for admitting compressed air into said combuster, means diverting some of the air from said compressor, by-passing the combustion chamber and conducting same into the tubular power shaft, said shaft having air holes for flowing air into the space between said combuster inner wall and said shaft, said combuster inner wall being otherwise closed off from communication with said annular air chamber and from said combuster interior, said combuster walls providing an annular fuel inlet gap facing the shaft, said shaft having a fuel slinger secured to said shaft and provided with fuel outlet orifices radially aligned with said fuel inlet gap, and fuel supply means for said slinger.

References Cited in the file of this patent

UNITED STATES PATENTS 2,812,898    Buell _____ Nov. 12, 1957

FOREIGN PATENTS 491,080    Canada _____ Nov. 30, 1948
622,181    Great Britain _____ Apr. 27, 1949